United States Patent
Aarup

[15] 3,671,055
[45] June 20, 1972

[54] COASTER VEHICLE

[72] Inventor: Carl P. Aarup, Springfield, Ill.
[73] Assignee: Dura Corporation, Springfield, Ill.
[22] Filed: Jan. 29, 1971
[21] Appl. No.: 110,971

[52] U.S. Cl. .................................280/87.01, 280/87.04 A
[51] Int. Cl. .......................................................B62k 9/00
[58] Field of Search..........280/87.01, 87.02, 87.04, 87.04 A, 280/205

[56] References Cited

UNITED STATES PATENTS

| | | | |
|---|---|---|---|
| D214,177 | 5/1969 | Greer | 34/15 |
| 2,589,182 | 3/1952 | Zarat | 280/87.01 |
| 3,220,744 | 11/1965 | Gomory | 280/87.01 X |
| 3,310,320 | 3/1967 | Hanna et al | 280/87.04 |
| 3,399,904 | 9/1968 | Schinke | 280/87.04 A |
| 3,512,798 | 5/1970 | Siegel | 280/87.04 A |
| 3,604,726 | 9/1971 | Tracy | 280/205 |

*Primary Examiner*—Leo Friaglia
*Attorney*—Hill, Sherman, Meroni, Gross & Simpson

[57] ABSTRACT

The invention herein disclosed relates to a coaster vehicle comprising a body having a rider compartment with handrails running along the top lateral edges of said compartment. The body of the vehicle is continuously curved upwardly and outwardly in transverse cross-section and decreases in width from the rear to the front. Mounted on transverse axes adjacent to the front and rear end of the body and projecting outwardly through openings in the bottom thereof are spherical rollers, the centers of which lie in the longitudinal vertical plane of the vehicle. By reason of these spherical rollers the vehicle will operate on a surface having a high coefficient of friction. Steering is effected by the rider leaning to one side or the other to effect drag of the bottom portion of the vehicle.

6 Claims, 3 Drawing Figures

PATENTED JUN 20 1972 3,671,055
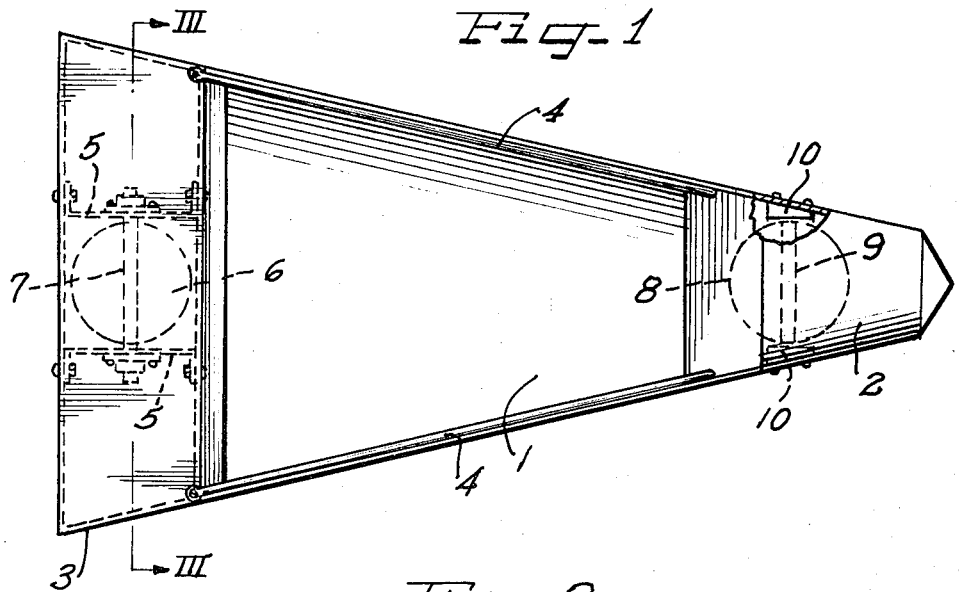
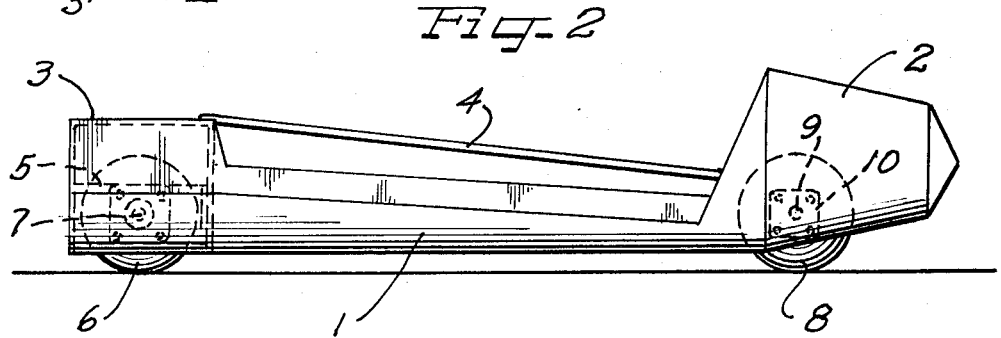
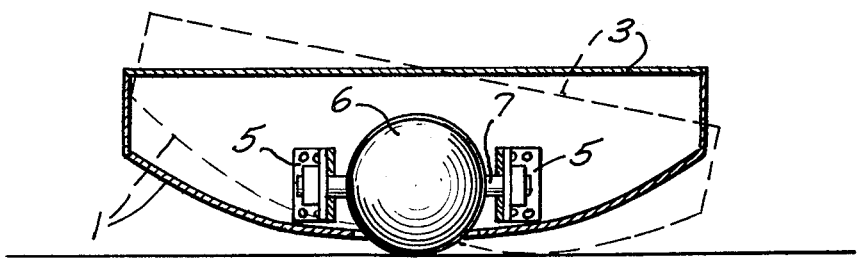
INVENTOR.
Carl P. Aarup

COASTER VEHICLE

BACKGROUND OF THE INVENTION

SUMMARY OF THE INVENTION

It has been known in the art to provide coaster vehicles having cylindrical rollers projecting from the bottoms thereof in order to permit operation over a surface having a high coefficient of friction. Such vehicles, however, have been hard to steer because of resistance to tilting interposed by such cylindrical rollers. Coaster vehicles with upwardly and outwardly curved bodies but without anti-friction means are also known in the art. With such bodies it has been necessary to provide a series of generally parallel ribs or runners extending longitudinally of the exterior of the vehicle body in order to effect the lateral holding required to effect proper steering. Such structures are complicated and expensive in that the bodies cannot readily be produced by a stamping or molding operation.

This invention overcomes the foregoing difficulties by providing a readily moldable vehicle body portion which decreases in width from rear to front and which is curved upwardly and outwardly relative to the transverse cross-section and which has a smooth uninterrupted exterior surface. Tilting of the vehicle body to effect steering is facilitated by the spherical rollers projecting through the body with their centers located in the longitudinal vertical plane of the vehicle. Since such tilting causes contact to be made over a larger area at the rear of the vehicle steering is further facilitated.

It is an object, therefore, of the present invention to provide a coaster vehicle which may be produced at a relatively low cost and which is readily and effectively steerable by the tilting or shifting of weight of the rider's body. It is a further object of this invention to provide a readily tiltable coaster vehicle which will operate over surfaces having a high coefficient of friction.

Other and further objects of this invention will be apparent from the specification and the accompanying drawings in which the invention is shown in a preferred form.

BRIEF DESCRIPTION OF DRAWINGS

FIG. 1 is a top plan view of a coaster vehicle embodying the principles of this invention with the spherical anti-friction rollers shown in dotted lines and with a part in section showing a method of mounting the front friction roller.

FIG. 2 is a side elevation of the view shown in FIG. 1.

FIG. 3 is a transverse section on the line III—III of FIG. 1 with dotted lines showing contact of the bottom of the vehicle body when the same is tilted for steering.

DETAILED DESCRIPTION OF THE DRAWINGS

Reference numeral 1 indicates a body potion which as shown in FIGS. 2 and 3 is curved upwardly and outwardly from the center line of its bottom and which as shown in FIG. 1 decreases in width from the rear to the front end thereof (from left to right as viewed in FIG. 1). This body portion 1 is made of any relatively strong lightweight material, as, for example, from stamped stainless steel or from a molded plastic incorporating chopped glass fibers which add to the strength thereof. The method of stamping or molding the body portion forms no part of this invention and since such methods are well known in the art they need not be described further herein.

Affixed to or molded with the body member 1 is a hood-like nose portion 2 which covers the front of the vehicle and a box-like seat portion 3 at the rear of the vehicle. At either side of the vehicle and spaced from the upper edge of the body 1 running generally from the seat portion 3 to the nose portion 2 are handrails 4 to be grasped by the rider as desired during operation of the vehicle. Journaled within the seat portion 3 on brackets 5 is a rear anti-friction roller 6 rotatable on an axis 7 transverse of the vehicle body with its center line in the longitudinal vertical plane of the vehicle body. This anti-friction spherical roller 6 may be made of relatively hard molded plastic or stamped from hollow metal, as may be desired, the requirement being that it be wear-resistant and relatively light in weight. Also mounted in the central longitudinal plane of the vehicle body at the front end thereof is a similar anti-friction spherical roller 8 which is rotatable on a transverse axis 9 supported by brackets 10 secured at the sides of the vehicle body inside the nose portion 2 thereof. As a result the body when in upright position is carried on two spherical rollers mounted in its longitudinal vertical plane. The provision of such rollers facilitates movement of the coaster vehicle over surfaces having a relatively high coefficient of friction, such, for example, as grass covered or bare ground, concrete sidewalks or the like. As will be apparent from FIG. 3, the body of the vehicle is readily tiltable about its longitudinal vertical axis on the tilt pivots provided by the spherical rollers 6 and 8 and when so tilted a relatively wide portion of the body member 1 will contact a surface on which the vehicle is operating thus tending to brake movement of that side of the vehicle toward which the body is tilted and to cause the front end of the vehicle to turn in that direction. Because of the decreasing width of the vehicle from front to rear a greater portion of the steering effort is effective at the rear of the vehicle, this further facilitating the turning of the nose portion in a desired direction.

The coaster vehicle of this invention is thus one which will operate either on snow or ice or other surfaces having low coefficients of friction or upon grass covered or bare ground or concrete having higher coefficients of friction in which case, except during steering, the spherical rollers permit of ready coasting operation whereas in snow those rollers do not objectionably impede progress even when portions of the bottom of the body portion rest against the snow.

The vehicle of this invention is thus readily steerable and is operable over a wide variety of surfaces. As constructed, either of stamped stainless steel or similar material or of molded plastic reinforced by chopped glass fibers, the vehicle is lightweight and strong and may be produced at relatively low cost.

I am aware that details of the present invention may be varied and I, therefore, do not purpose limiting the patent granted hereon otherwise than necessitated by the scope of the appended claims.

I claim:
1. In a coaster vehicle,
an open top body member curved upwardly and outwardly about a median bottom line,
spherical anti-friction rollers mounted on transverse axes in said body member adjacent the ends thereof with their centers in the longitudinal vertical central plane of said body member and projecting through openings in the bottom of said body member so that the vehicle in upright position is supported by said rollers for coasting movement thereon and so that when the body member is tilted to one side its bottom will contact the surface on which the vehicle is moving to effect steering of the vehicle.

2. A vehicle as defined in claim 1, wherein the body member decreases in width from the rear to the front end thereof.

3. A vehicle as defined in claim 1, wherein the body member is provided with a handrail at each side of the top portion thereof.

4. A vehicle as defined in claim 1, wherein the body member is provided with a seat member at the rear end thereof above the spherical roller at that end.

5. A vehicle as defined in claim 2, wherein the narrow front end of the body member is provided with a covering nose member.

6. A vehicle as defined in claim 1, wherein the body member is of one-piece molded or stamped construction having a continuously smooth outer surface.

* * * * *